(12) United States Patent
Hüttlin

(10) Patent No.: US 7,798,092 B2
(45) Date of Patent: Sep. 21, 2010

(54) PROCESS AND APPARATUS FOR TREATING A PARTICULATE MATERIAL

(76) Inventor: Herbert Hüttlin, Rümminger Strasse 15, 79539, Lörrach (DE)

( * ) Notice: Subject to any disclaimer, the term of this patent is extended or adjusted under 35 U.S.C. 154(b) by 868 days.

(21) Appl. No.: 10/823,926

(22) Filed: Apr. 14, 2004

(65) Prior Publication Data

US 2004/0255981 A1 Dec. 23, 2004

(30) Foreign Application Priority Data

Apr. 14, 2003 (DE) ................................ 103 18 302

(51) Int. Cl.
*B05C 5/00* (2006.01)
(52) U.S. Cl. .......................... 118/19; 118/303; 118/320; 118/418
(58) Field of Classification Search ................... 118/19, 118/303, 319, 320, 418, DIG. 5; 366/137.1, 366/138; 422/140, 143; 241/18; 494/63, 494/80, 25, 26
See application file for complete search history.

(56) References Cited

U.S. PATENT DOCUMENTS 4,587,744 A 5/1986 Huttlin .................... 34/57 R
5,180,358 A * 1/1993 Pace ............................ 494/48
5,507,871 A 4/1996 Morino et al. ............... 118/680

FOREIGN PATENT DOCUMENTS

| DE | 44 06 685 A1 | 9/1994 |
| DE | 101 04 184 A1 | 8/2002 |
| EP | 0 103 900 B1 | 12/1986 |
| WO | WO 00/10699 | 3/2000 |
| WO | WO 00/16887 | 3/2000 |

\* cited by examiner

*Primary Examiner*—Laura Edwards
(74) *Attorney, Agent, or Firm*—St. Onge Steward Johnston & Reens LLC

(57) ABSTRACT

A process for treating a particulate material is described, comprising the steps of filling the material into a container, the container having a base, an upright wall widening from bottom to top, and a deflection element adjoining the wall in an upper region of the container, moving the material in the container in a continuous circulatory movement along the base to the wall and along the wall upward by rotating the wall about a vertical axis of rotation, and moving the material along the deflection element by an air stream, which is introduced substantially from bottom to top through at least one air gap in a transition region from the wall to the deflection element and, in a region adjacent to the air gap, substantially tangentially with respect to the course of at least one of the wall and the deflection element. Further an apparatus for carrying out the process is described.

28 Claims, 3 Drawing Sheets

PROCESS AND APPARATUS FOR TREATING A PARTICULATE MATERIAL

CROSS REFERENCE TO FOREIGN APPLICATION

The present application claims priority of German patent application 103 18 302.7 filed on Apr. 14, 2003.

BACKGROUND OF THE INVENTION

The invention relates to a process for treating a particulate material, in which, in a container which has a base, an upright wall that widens from bottom to top, and in the upper region a deflection element that adjoins the wall, the material is moved in a Continuous circulatory movement along the base to the wall and along the wall as a result of rotation of the wall upward about a vertical axis of rotation and is deflected at the deflection element in such a way that it can pass back to the base.

The invention further relates to an apparatus for treating a particulate material, comprising a container which has a base, an upright wall that widens from bottom to top, and in an upper region a deflection element in order to deflect the direction of movement of the material moved upward along the wall in such a way that it can pass back to the base again, it being possible for the wall to be driven in rotation about a vertical axis of rotation.

The treating of a particulate material can consist in treating the material with a covering medium, in particular for coating medical, nutritional, industrial or chemical articles.

A process and an apparatus of the type mentioned at the beginning are used, for example, in the pharmaceutical, chemical, confectionery or foodstuffs industry. In the pharmaceutical industry, by means of sugar coating, medicaments are produced which are covered with a sugar syrup. By means of film coating, film or varnished tablets are produced, which is also understood to mean medicaments coated with a polymer.

In the apparatus and the process known from WO 00/10699, the particulate material is put into the container and, as a result of rotation of the wall of the container, is moved in a continuous circulatory movement along the base and the upright rotating container wall from a lower region into an upper region of the container, is deflected by a deflection element in the upper region of the container and is moved back again along an internal return surface spaced apart radially from the first container wall to the likewise rotating base of the container.

The deflection element, which is provided with a plurality of guide vanes, is firmly connected to the container wall and accordingly corotates at the same rotational speed as the wall of the container.

A further apparatus of the generic type is disclosed by DE 101 04 184 A1. This differs from the known apparatus described previously in that the return surface for feeding back the particulate material to the base of the container is arranged outside the upright wall of the container, which can be set rotating. In addition, the container of this known apparatus has in its upper region a deflection element in order to deflect the movement of the material, rising upward along the wall as a result of rotation of the upright wall, in such a way that it can pass back to the base of the container along the return surface arranged radially outside. In this known apparatus, the deflection element is static, that is to say it does not corotate during the circulatory movement of the particulate material.

Furthermore, WO 00/16887 discloses an apparatus for drying pourable products, comprising a rotor chamber, in which there is arranged a container rotating about a vertical axis of rotation, the container having a central horizontal surface and, at least in its radially outer third, a conical periphery, the conical periphery having at least partially two-dimensional gas passages in the form of perforations or screens. Through the gas passages, a dry gas is fed two-dimensionally into the conical periphery to the products to be dried during their radial peripheral circulation, without said products being swirled in the process and being subjected to impermissible pressure, shock and/or frictional loading. Above the conical periphery forming the wall of the container there is a deflection element which is provided with guide vanes which have the form of a segment of a spiral.

The known apparatuses and processes are disadvantageously suitable only for treating that material which consists of relatively large particles, for example of tablets and the like. The known apparatuses and processes are less suitable for treating material which consists of very small particles, for example pellets. In particular during the movement of the particles of the material along the deflection element, high braking forces act on the particles, which have a corresponding abrasive action on the particles. In the case of particularly small particles, this can rapidly lead to the destruction of the particles. On the other hand, in the case of small particles, it is possible that, on account of their low mass and therefore low kinetic energy which they can pick up because of their centrifugal upwardly directed movement resulting from the rotation of the wall of the container, they are not deflected reliably at the deflection element.

Blowing air in through a perforation in the rotating wall of the container, as in the apparatus and the process according to the aforementioned WO 00/16887, is likewise not suitable for the treatment of a material composed of very small particles, since the edges of the perforations firstly likewise have an abrasive action and secondly an air feed at a corresponding pressure is required in order to avoid the small particles escaping from the container through the perforations during their treatment. Increasing the blowing pressure would automatically entail a considerable increase in the quantity of process air and would swirl the particles, but this is precisely not desired in this type of process. Accordingly, the perforations would have to be configured to be of very small diameter, as a result of which, however, sufficient air cannot be fed into the container, in particular to adequately dry the particles of a treatment with a moist covering medium.

For these reasons, pellets are currently produced and treated virtually exclusively in what are known as fluidized bed apparatuses, in which the material is fluidized by an air supply from the base of the container but not circulated on account of a centrifugal movement resulting from rotation of the container wall.

SUMMARY OF THE INVENTION

The invention is therefore based on the object of developing a process and an apparatus of the type mentioned at the beginning to the effect that they are not only suitable for treating large particulate material but also small particulate material.

According to one aspect of the present invention, a process for treating a particulate material, is provided, comprising the steps of filling said material into a container, said container having a base, an upright wall widening from bottom to top, and a deflection element adjoining said wall in an upper region of said container; moving said material in said container in a continuous circulatory movement along said base to said wall and along said wall upward by rotating said wall about a vertical axis of rotation; and moving said material along said deflection element by means of an air stream, which is introduced substantially from bottom to top through at least one air gap in a transition region from said wall to said deflection element and, in a region adjacent to said air gap, substantially tangentially with respect to the course of at least one of said wall and said deflection element.

According to another aspect of the present invention, an apparatus for treating a particulate material, is provided, comprising: a container having a base, an upright wall widening from bottom to top, and a deflection element adjoining said wall in an upper region of said container in order to deflect a direction of movement of said material; said wall being rotatable about a vertical axis of rotation; at least a first air gap in a transition region from said wall to said deflection element; and an air feed device for feeding an air stream through said at least one first air gap into said container, at least one of said first air gap and said air feed device being configured such that said air stream introduced through said first air gap has a flow component oriented substantially from bottom to top and, in a region adjoining said air gap, oriented substantially tangentially with respect to the course of at least one of said wall and said deflection element.

The air stream introduced through the at least one air gap produces on the sliding surface of the deflection element an air film or an air cushion, on which the particles of the material are moved along the deflection element with substantially reduced friction or even without friction. Furthermore, the air stream introduced through the at least one air gap imparts sufficient kinetic energy in particular to small particles, in order that the latter are deflected reliably at the deflection element. In other words, the deflection of the material at the deflection element is assisted pneumatically. The air stream introduced additionally prevents the particles being able to escape from the container through the air gap during their treatment. A further additional advantage of the configuration according to the invention of the apparatus of the process is that, in the case in which the particles of the material are treated with a moist covering medium, the air introduced through the at least one air gap can be used at the same time for drying the particles. In this configuration, it is possible to dispense completely with perforation of the rotating wall, as provided in the prior art, which can be detrimental to a treatment of small particulate material.

The at least one air gap preferably extends interruptedly or uninterruptedly over the full circumference of the container, and the air stream is then preferably introduced through the air gap over the entire circumference.

In a preferred refinement of the process, the air stream is introduced through the at least one air gap at least with a flow component which extends along a surface line of the wall or of the adjacent deflection element.

In this refinement, the air stream, apart from an upwardly directed flow component, can additionally have a flow component oriented in the circumferential direction of the container, which is preferably oriented in the direction of rotation of the wall of the container. In this way, the movement component of the particles established by the rotation of the wall of the container can advantageously be picked up and maintained, boosted or gradually retarded in the circumferential direction by the air stream.

In a further preferred refinement of the process, the air stream is introduced through the at least one air gap exclusively with a flow component which extends along a surface line of the wall or of the adjacent deflection element.

In this case, it is advantageous that it is possible to dispense with guide vanes on the deflection element, as are provided in the prior art, in order to deflect the particles into a movement directed downward, since, as a result of the air stream, the particles cannot collect in the concave curvature of the deflection element on account of a circumferential movement component and cannot remain in a circumferential movement on the deflection element. From the end of the deflection element, which faces away from the wall of the container, the particles then fall off the deflection element in the direction of the base substantially without any movement component in the circumferential direction of the container.

In a further refinement of the process, before the material has reached the end of the deflection element, the air stream is at least partly led away upward out of the container.

In this case, it is advantageous that the air stream flowing along the deflection element is not deflected downward, at least not completely, and thus cannot pass into the interior of the container where, for example, it has a detrimental effect on other process air flows or, for example, a spray mist with which, for example, a covering medium is sprayed onto the particles.

In a further preferred refinement of the process, the material is moved along the base by means of a further air stream, which is introduced into the container from below through at least one air gap in the base and with a flow component running substantially tangentially with respect to the base and oriented toward the wall.

In this case, it is advantageous that the particle movement can also be effected along the base by means of a directed air stream, as a result of which the base can preferably be configured statically, that is to say in this case the base does not need to corotate with the wall of the container in order to move the particles on the base toward the wall. In addition, if the material is treated with a moist covering medium, the air stream introduced through the base can be used for drying the particles. In addition, the tangential introduction of the air stream into the base region of the container has the advantage that the air stream does not have a detrimental effect on air-sensitive treatment processes, such as spraying the particles with a moist covering medium above the base.

In a further preferred refinement of the process, the material is sprayed with a moist covering medium, which is sprayed onto the material in the form of an annular spray mist before the material passes back to the base, and the spray mist is acted on with an air stream oriented from top to bottom in such a way that the spray mist is oriented substantially horizontally.

This measure has the advantage that it is ensured that the spray mist is formed around the nozzle in a circumferential angle of 360°, by the air stream fed in from above forming an air film emerging in a flat manner above the spray mist or spray umbrella.

In a further preferred refinement of the apparatus, in the transition region from the wall to the deflection element, there is at least a second air gap, which is spaced apart vertically from the first air gap, the second air gap and/or the air feed device being configured such that an air stream fed in by the air feed device has a flow component oriented substantially from bottom to top and, in the region adjoining the air gap, oriented substantially tangentially with respect to the course of the wall and/or of the deflection element.

As a result of providing at least two air gaps in the transition region from the wall to the deflection element, the advantageous effects which have already been described previously in connection with the at least one air gap can be boosted further. For example, the effect of the two air streams on the material to be moved along the deflection element can be different, in that, for example, the first air stream is more intense in the direction of movement of the material than the second air stream, in order in the case of large containers and large particles, in which the particles at the upper end of the rotating wall have a high kinetic energy, to brake the particles slowly, specifically by means of the air stream itself, without being subjected to high friction on the deflection element.

In a further preferred refinement of the apparatus, the air feed device has a first feed duct for feeding a first air stream to the first air gap, and at least a second feed duct separated from the first feed duct for feeding a second air stream to the at least one second air gap.

If a plurality of air gaps are provided, this measure has the advantage that each air stream fed to the air gaps can be adjusted independently, for example with regard to the quantity of air and the flow pressure.

In a further preferred refinement of the apparatus, the deflection element has a first section which directly adjoins the wall, the first air gap being present between an upper end of the wall and a lower end of the first section.

In this case it is advantageous that the air stream fed in through the at least one air gap is formed only along the deflection element but not along the upper region of the rotating wall, so that the kinematics of the particles in the upper region of the wall are determined solely by the rotation of the latter.

In this case, it is further preferred if the first section widens from bottom to top with a shape accommodating the shape of the wall in the region of the upper end of the latter.

Here, it is advantageous that the air stream introduced through the at least one air gap picks up the movement of the material without the latter being subjected to an abrupt change in direction. As a result, loading of the particles at the transition from the rotating wall to the deflection element is avoided.

In a further preferred refinement, the first section of the deflection element does not corotate with the wall.

Corotation of the deflection element with the rotating wall is not required either on account of the air stream introduced through the at least one air gap, in order to avoid an excessive braking action on the particulate material and increased abrasion associated with this. At the same time, by means of the static first section, it is possible to dispense with a rotary drive for this section, which simplifies the construction of the apparatus according to the invention and therefore reduces the production costs.

In a further preferred refinement of the apparatus, the deflection element has at least a second section, the second air gap being arranged between an upper end of the first section and a lower end of the second section.

With this refinement, a second air gap in addition to the first air gap is implemented in a constructionally advantageously simple manner. The deflection element can also have more than two sections if more air gaps are accordingly to be provided, in particular in the case of large apparatuses in which the deflection element is of a corresponding size.

In this case, it is further preferred for the second section, as viewed from the center of the container, to be curved concavely, and for a lower end of the second section to adjoin the upper end of the first section with a continuous shape.

The concave second section of the deflection element then effects the actual deflection of the direction of movement of the particulate material in the direction of the base of the container, while the continuous-shaped connection of the second section to the first section again advantageously avoids an abrupt change of movement of the particles at the transition from the first section to the second section, and therefore increased abrasion.

In a further preferred refinement, the second section does not corotate with the wall.

The advantages which are already achieved in connection with the refinement according to which the first section of the deflection element does not corotate with the wall also arise here. Overall, the deflection element is preferably configured in such a way that it does not corotate with the rotating wall of the container but is static.

In a further preferred refinement of the apparatus, the deflection element is air-permeable over a subregion which follows the at least one first or, if appropriate, at least one second air gap.

By means of the air-permeable subregion of the deflection element, the air introduced through the at least one air gap can at least partly be led away upward out of the container, which advantageously avoids the air stream introduced through the at least one air gap having a detrimental effect on treatment processes which are proceeding in the interior of the container, as already described above. The air permeability of the aforementioned subregion of the deflection element can be implemented, for example, by means of perforation of the deflection element, it being possible for these perforations to be configured to be very small in the sense of a treatment of small particulate material to be made possible, so that the escape of particles through the perforations is avoided. Since here only air is led away, such perforations can also be configured in a miniaturized form, as distinct from blowing in air through a perforation for the purpose of drying the particles since, when drying air is fed in, a correspondingly high throughput is required.

In a further preferred refinement of the apparatus, the width of the first and/or, if appropriate, second air gap and/or the pressure and throughput of the air stream are adjustable.

By means of the ability to adjust the at least one air gap, the quantity of the air stream can be matched to the respective material, in particular particle size. The at least one air gap can preferably also be closed entirely or opened to such an extent that the material can be emptied out of the container out of the movement through the air gap with the air stream switched off.

In a further preferred refinement of the apparatus, adjustable guide elements are arranged at the at least one air gap.

In this case, it is advantageous that, by means of the adjustable guide elements, a stable direction can be given to the particles by influencing the flowing direction of the air stream introduced through the at least one air gap, for example the particles can have impressed on them a direction of movement oriented exclusively in the direction of a peripheral line of the wall or of the deflection element in accordance with the refinements described above or, additionally, a direction of movement oriented in the circumferential direction or a movement component oriented in the direction of rotation of the wall.

In a further preferred refinement of the apparatus, the base has at least one air gap, an air feed device being provided for the base, the at least one air gap in the base and/or the air feed device for the base being configured in such a way that the air stream introduced through the air gap in the base has a flow component oriented substantially tangentially with respect to the base and toward the wall.

This measure achieves the advantage already described above that the material can be moved along the base toward the wall by means of the air stream introduced through the at least one air gap without the base having to be set rotating like the wall for this purpose. In addition, the air stream introduced through the air gap can be used for drying the particles, if the latter have been sprayed with a moist covering medium, without this air stream for example having a detrimental effect on the spray mist located above the base and with which the covering medium is sprayed on.

In this case, it is further preferred for the base to be constructed from a plurality of concentric ring elements with different diameters, which are arranged in layers partly overlapping one another radially and between which a plurality of air gaps form.

This refinement has the advantage that a large quantity of air can be introduced into the container in a specific and targeted manner through the plurality of air gaps and thus, on account of its increased absorption capacity for moisture, can be used particularly well for drying.

In a further preferred refinement of the apparatus, the width of the at least one air gap in the base can be adjusted.

This measure also again advantageously contributes to the flexibility of the apparatus according to the invention and the process according to the invention since, via the ability to adjust the width of the at least one air gap in the base, the quantity of air introduced through this air gap can be varied and monitored. In addition, the at least one air gap in the base can also be closed completely because of the ability to adjust the width, which means that particulate material can be prevented from falling out through the at least one air gap, for example when putting the material into the container before the start of the process or after completing the treatment process.

In a further preferred refinement of the apparatus, the at least one air gap in the base opens automatically as a result of being acted on with the air stream and, when the air stream decreases or is switched off, automatically diminishes or closes.

In this case, it is advantageous that the closing and opening of the at least one air gap in the base is carried out automatically as a result of starting up, that is to say as a result of switching on the apparatus in order to carry out a treatment process, or as a result of shutting down, that is to say as a result of shutting off the apparatus after the treatment process has been completed, without the operating personnel having to adjust and monitor the at least one air gap in accordance with the respective operating state.

In a further preferred refinement of the apparatus, the base has air guide elements which additionally impart to the air stream introduced through the at least one air gap in the base a flow component oriented in the direction of rotation of the wall.

In this case, it is advantageous that the particles, during their movement along the base, already pick up an additional movement component oriented in the circumferential direction, by which means a gentler transition of the particles from the base to the rotating wall is achieved, which means that abrasion effects at the transition to the wall are reduced or even excluded.

In a further preferred refinement of the apparatus, the base does not corotate with the wall.

Corotation of the base is not required, as distinct from the known apparatuses from the prior art, if the movement energy is fed to the particles of the material via the air flow which is introduced through the at least one air gap in the base. However, the base can also be configured so as to rotate about the vertical axis of rotation, it being additionally possible to provide for the base to rotate at a different rotational speed from that of the wall. However, a base that does not corotate has the advantage that no separate drive has to be provided for the base if the latter is not connected in one piece to the wall of the container.

In a further preferred refinement of the apparatus, the container has a return surface that tapers from top to bottom, on which the material deflected by the deflection element is moved back downward in the direction of the base.

The return surface has the advantage that the particulate material does not fall from the deflection element over the height of the container onto the base, where it could be damaged on account of the impact speed or jump away from the base again. The return surface thus advantageously contributes to gentle and homogeneous circulation of the particulate material.

In this case, it is further preferred for the return surface to be supported on the wall via a sliding ring bearing in such a way that it does not corotate or corotates only slightly with the wall.

This configuration is advantageous in particular when the particles, during their deflection on the deflection element, do not have any movement component in the circumferential direction of the container and thus fall off the deflection element in the form of a ring-like vertical curtain. This is because, in this case, the return surface cannot be suspended with crossmembers which project upward out of the container, since these crossmembers would interfere with the material as it falls onto the return surface. The provision of a sliding ring bearing, via which the return surface is supported on the wall, in this case has the advantage that the return surface at least does not corotate with the wall at the rotational speed of the latter, but at most at a very low rotational speed which results from the friction of the sliding ring bearing.

In a further preferred refinement of the apparatus, the return surface is constructed from a plurality of concentric ring elements, which partly overlap one another and between which a plurality of air gaps form.

In this case, it is advantageous that the return surface can also be flooded with one or more air streams in a directed and specific manner, which can assist the downwardly directed movement of the particles of the material in the direction toward the base.

Accordingly, in a preferred refinement, provision is made for the air gaps in the return surface to be configured in such a way that an air stream introduced through them has a flow component oriented from top to bottom and substantially parallel to the course of the return surface.

The further advantage of flooding the return surface with an air stream arises not only in improved kinematics of the movement of the particles on the return surface but can additionally also be used for drying the particles if the latter are treated with a moist covering medium.

In a further preferred refinement of the apparatus, a spraying device for spraying the material with a moist covering medium is arranged in the container and has an annular gap nozzle, the nozzle being arranged upright in the container and the covering medium and spraying air being fed into the nozzle from bottom to top, it being possible for the nozzle to be acted on from above with an additional air stream.

It has been shown that an upright arrangement of an annular gap nozzle, as compared with a suspended arrangement, has the advantage that the spraying function is improved in the case of an upright arrangement. The air stream additionally fed in from above ensures that the spray mist forms uniformly in a circumferential angle of 360° and a substantially horizontal spray mist is produced, which wets the particles of the material uniformly at a well-defined position preferably as they flow down from the return surface toward the base.

Further advantages emerge from the following description and the appended drawing.

It goes without saying that the features mentioned above and those still to be explained below can be used not only in the respectively specified combination but also in other combinations or on their own without departing from the scope nations or on their own without departing from the scope of the present invention.

BRIEF DESCRIPTION OF THE DRAWINGS

An exemplary embodiment of the invention is illustrated in the drawing and will be described in more detail hereafter with reference to the latter, in which.

DETAILED DESCRIPTION OF A PREFERRED EMBODIMENT

Figure 1:
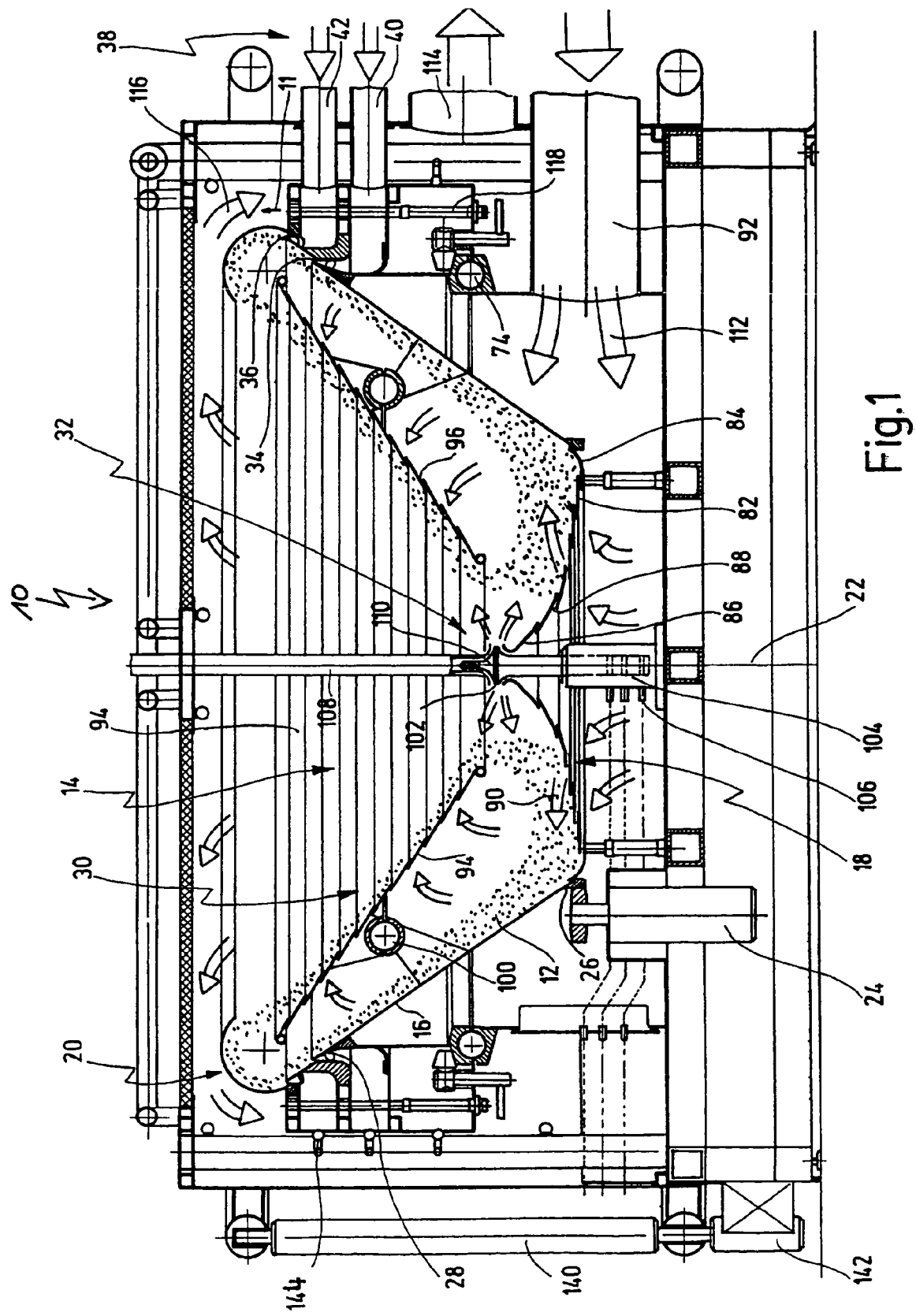
FIG. 1 shows an apparatus for treating a particulate material in a section through a vertical longitudinal mid-plane of the apparatus.
Figure 2:
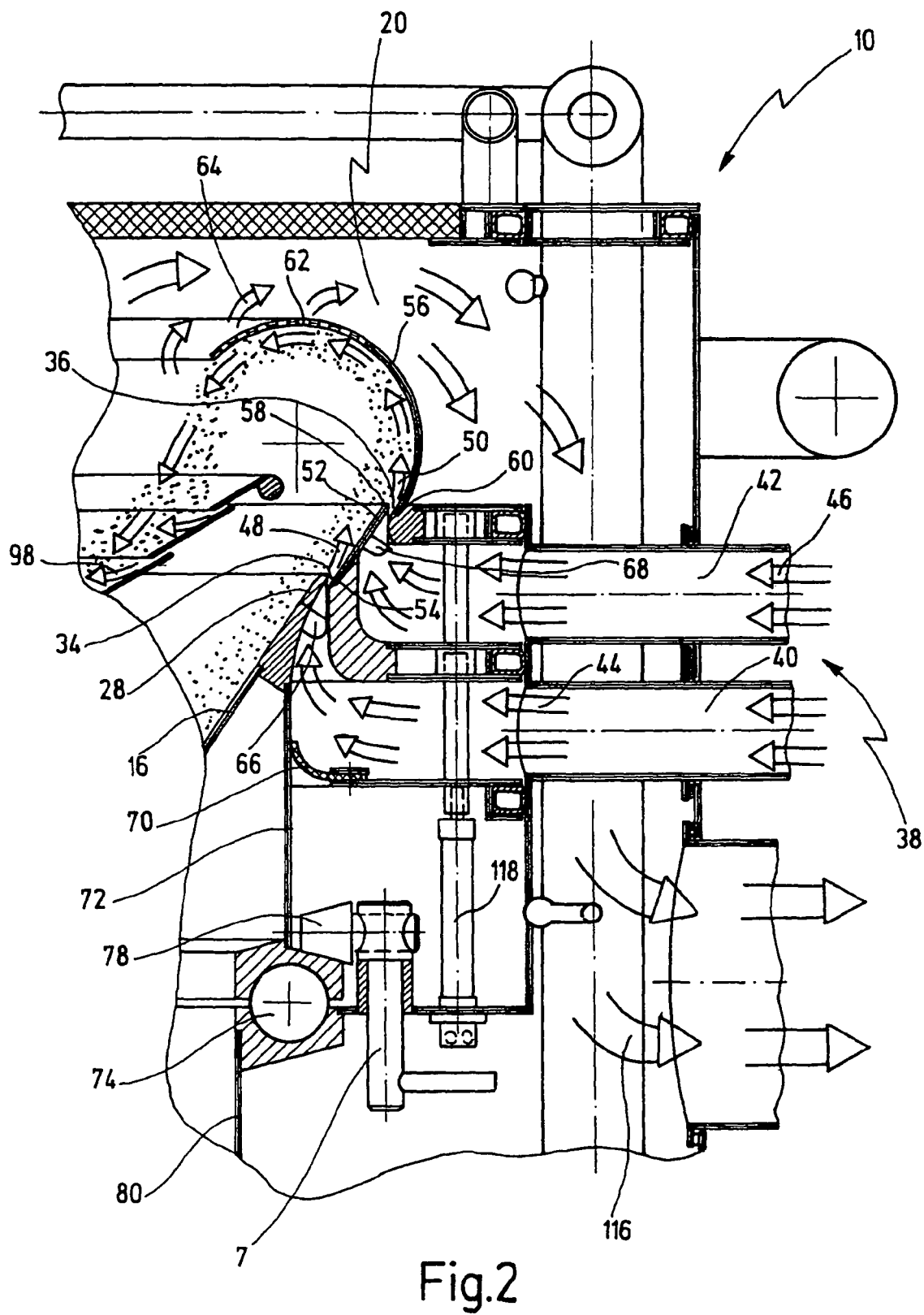
FIG. 2 shows an enlarged detail of the apparatus in FIG. 1.
Figure 3:
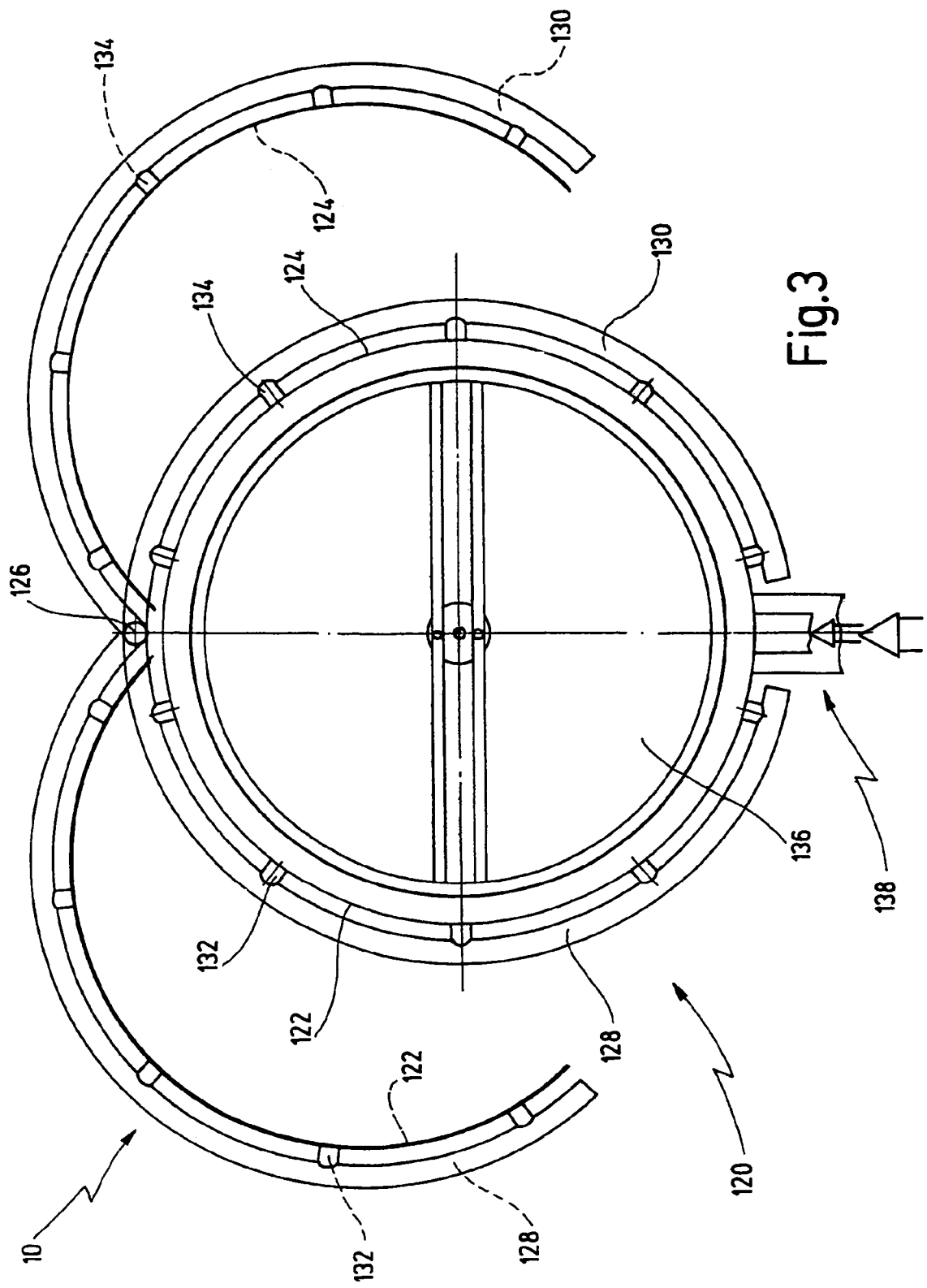
FIG. 3 shows a plan view of the frame of the apparatus in FIG. 1.

FIG. 1 illustrates an apparatus, provided with the general reference number 10, for treating a particulate material 12, which is indicated by a large number of dots. An enlarged detail of the apparatus 10 is illustrated in FIG. 2. FIG. 3 shows further features of the apparatus 10.

The apparatus 10 is used in particular for treating a particulate material with a covering medium, in particular for coating medical, nutritional, industrial or chemical articles or for producing or treating pellets. The apparatus 10 has a container 14, in which the material 12 is circulated in a continuous movement.

The container 14 has an upright wall 16 widening from bottom to top, a base 18 adjoining the wall 16 at the bottom and a deflection element 20 adjoining the wall 16 at the top.

The wall 16 can be driven in rotation about a vertical axis of rotation 22. A rotary drive 24 is provided for the wall 16, and engages with a lower end 26 of the wall 16. An upper end of the wall 16 is provided with the reference number 28.

Between its lower end 26 and its upper end 28, the wall 16 is air-impermeable.

Also arranged in the container 14 is a return surface 30 as a return surface for the material 12. The return surface 30 tapers from top to bottom and, in the exemplary embodiment shown, is conical. Likewise, the wall 16 is conical, but has a smaller opening angle than the return surface 30.

Finally, as a further subassembly, the apparatus 10 has a spraying device 32; with which a moist covering medium is sprayed onto the particulate material 12 during its circulatory movement.

In the following text, first of all the apparatus 10 will be described in more detail in the region of the wall 16 and of the deflection element 20 with reference to FIG. 2.

In the transition region from the wall 16 to the deflection element 20 there are a first air gap 34 and a second air gap 36.

An air feed device 38 has a first feed duct 40 and a second feed duct 42. Via the first feed duct 40, an air stream indicated by arrows 44 is fed to the first air gap 34, while via the second feed duct 42, an air stream indicated by arrows 46 is fed to the second air gap 36. The first feed duct 40 and the second feed duct 42 are separated from each other in an airtight manner, so that the air stream fed in through the feed duct 40 is independent of the air stream fed in through the feed duct 42. These two air streams can certainly be produced by the same source, for example a high-pressure blower (not illustrated) but can also originate from different sources and, in particular with regard to the quantity of air fed in and the pressure, can be adjusted independently of each other, in particular differently.

The first air gap 34 and the second air gap 36 and/or the air feed device 38 are configured in such a way that the respective air stream introduced through the air gap 34 or 36 has a flow component, indicated by arrows 48 and 50, oriented substantially from bottom to top and, in the region adjoining the air gap 34 or 36, oriented substantially tangentially with respect to the course of the deflection element 20.

The deflection element 20 has a first section 52 which adjoins the wall 16 directly, the first air gap 34 being formed between the upper end 28 of the wall 16 and a lower end 54 of the first section 52. The upper end 28 of the wall 16 in this case slightly overlaps the lower end 54 of the section 52 on the inside.

The first air gap 34 extends over a circumference of 360° about the axis of rotation 22.

The first section 52 widens from bottom to top, as emerges from FIG. 2, with a shape that accommodates the shape of the wall 16 in the region of the upper end 28 of the latter, that is to say is configured as a conical peripheral section, like the wall 16.

The first section 52 is static, that is to say does not corotate with the wall 16 about the axis of rotation 22.

The deflection element 20 also has at least one second section 56, exactly one in the exemplary embodiment shown, the second air gap 36 being formed between an upper end 58 of the first section 52 and a lower end 60 of the second section 56. In this case, the upper end 58 of the first section 52 slightly overlaps the lower end 60 of the second section on the inside.

The second section 56, seen from the center of the container, is concavely curved, the lower end 60 of the second section 56 adjoining the upper end 58 of the first section 52 with a continuous shape or tangentially. The second section 56 is preferably configured to be semicircular in cross section, as illustrated.

Like the first section 52, the second section 56 of the deflection element 20 is also arranged statically, that is to say does not corotate with the wall 16 about the axis of rotation 22, but is stationary.

The deflection element 20, here the second section 56, is air-permeable over a subregion which follows the air gaps 34 and 36, preferably, as illustrated, over about the second half of the second section 56, for example having a perforation 62 in this subregion. The perforation 62 comprises a large number of very small holes, which avoids the particulate material 12 passing through, while at least some of the air streams introduced through the air gaps 34 and 36 can escape through the perforation 62, as indicated by arrows 64.

The width of the air gaps 34 and 36 is adjustable, preferably adjustable independently of each other.

At the first air gap 34 and the second air gap 36, a large number of guide elements 66 and 68 are arranged distributed circumferentially and spaced apart from one another, which are adjustable in order to influence the flow direction of the air streams introduced through the air gaps 34 and 36 and therefore to impart to the particulate material 12 a stable direction of movement.

The air streams introduced through the air gaps 34 or 36 can be oriented in such a way that they only have a flow component parallel to a surface line of the wall 16 and of the deflection element 20, respectively, such a surface line being located, for example, in the drawing plane of FIG. 3 and, in the latter, running along the deflection element 20.

The first air feed duct 40 is arranged statically, like the second feed duct 42. In order to seal off the first feed duct 40 with respect to the rotating part of the container 14, a sealing lip 70 is provided, which bears in a sliding manner on a rotating vertical wall 72 firmly connected to the wall 16.

The first feed duct 40 and the second feed duct 42 in the region of the air gaps 34 and 36 extend over 360°, like the air gaps 34 and 36, that is to say over a complete circumference of the container 14 and, in the immediate vicinity of the air gaps 34, 36, are oriented upward, as a result of which the air streams fed to the air gaps 34, 36 are already imparted an upwardly oriented flow component.

The rotatable wall 16 of the container 14 is rotatably mounted via a vertical wall 72 on a bearing point 74, which is preferably configured as a spherical ring bearing.

A hold-down 76 that can be pivoted out uses a roller 78 to hold the wall 16 on the bearing point 74 against a lower frame 80 of the apparatus 10 via the vertical wall 72.

Once again with reference to FIG. 1 the configuration of the base 18 and of the return surface 30 will be described in more detail in the following text.

The base 18 is constructed from a plurality of ring elements 82 which are concentric with respect to the axis of rotation 22, in each case have a different diameter and are arranged in layers partly overlapping one another radially, as revealed by FIG. 1. A ring element 84 with the largest diameter in this case forms the lowest ring element of the layer arrangement, while an inner ring element 86 with the smallest diameter forms the topmost ring element of the arrangement.

Between respectively adjacent ring elements 82, in each case an air gap 88 is formed, through which an air stream can be introduced with a flow component oriented substantially tangentially with respect to the base 18 and toward the wall 16, as indicated by arrows 90.

The air introduced through the air gaps 88 between the ring elements 82 of the base 18 is fed in via a further feed duct 92 belonging to the air feed device 38, it being possible for an air stream fed in through the feed duct 92 to originate from the same source as the air fed in through the feed ducts 40 or 42 to the air gaps 34, 36 or from a separate source, but the air fed in through the feed duct 92 is in any case separated from the air fed in through the feed duct 40 or the feed duct 42 and is fed in independently of the latter. For example, the air fed in through the feed duct 92 can also be conditioned differently with regard to temperature and dryness than the air fed in through the feed ducts 40 and 42.

The width of the air gaps 88 in the base 18 is in each case adjustable, it being possible for the adjustability among the air gaps 88 also to be provided independently of one another. In this case, provision is made for the air gaps 88 in the base 18 to open automatically when an air stream with an appropriate pressure is led through the feed duct 92 onto the underside of the base 18 and, when the air stream through the feed duct 92 decreases or is switched off, for the air gaps 88 to diminish automatically or close completely when the air stream is switched off completely.

In a manner not illustrated, at the air gaps 88, the base 18 can have air guide elements which additionally impart to the air stream introduced through the air gaps 88 a flow component oriented in the direction of rotation of the wall 16 about the axis of rotation 22.

This is advantageous in particular when the base 18 is static, as in the exemplary embodiment shown, that is to say is stationary and does not corotate with the wall 16 about the axis of rotation 22.

The return surface 30 is likewise constructed from a plurality of ring elements 94 which are arranged concentrically with respect to the axis of rotation 22, which decrease in diameter from top to bottom and are arranged partly overlapping one another. In each case adjacent ring elements 94 form between them a completely circumferential air gap 96 in each case, so that the return surface 30 has a plurality of such air gaps 96. The air gaps 96 are configured in such a way that an air stream introduced through them has a flow component oriented from top to bottom and substantially parallel to the course of the return surface 30, as indicated by arrows 98 in FIG. 2. Here, too, adjustable air guide elements can again be provided, in order to influence the flow direction of the air through the air gaps 96 specifically.

The return surface 30 is supported on the rotatable wall 16 of the container 14 via a sliding ring bearing 100. The sliding ring bearing 100 is configured in such a way that during the rotation of the wall 16 the return surface 30 corotates at most slightly on account of the unavoidable friction of the sliding ring bearing 100. The sliding ring bearing 100 is, for example, constructed in a way similar to the spherical ring bearing 74.

The spraying device 32 for spraying the material 12 with a moist covering medium has an annular gap nozzle 102, the nozzle 102 being arranged upright in the container 14. For this purpose, the spraying device 32 has a basic nozzle body 104 which has a total of three connections 106 in order to feed in the covering medium and spraying air or supporting air. The annular gap nozzle 102 is plugged into the basic body 104 and can be pulled off the latter.

The covering medium and spraying air are accordingly fed into the annular gap nozzle 102 from top to bottom in this arrangement. The annular gap nozzle 102 can be acted on from above with an additional air stream, which is fed in via a feed 108. The additional air fed in via the feed 108 in this way is led onto a conical or trumpet-like reflector shield 110 of the annular gap nozzle 102, as a result of which the air fed in this way emerges in a flat manner over a circumferential angle of 3600 in the region of the annular gap nozzle 102, and forms the spray mist discharged by the annular gap nozzle 102 homogeneously annularly and horizontally over a complete circumferential angle of 360°.

In the following text, a process for treating the particulate material 12 by means of the apparatus 10 will be described.

The particulate material 12 is preferably put into the container 14 with the wall 16 not yet rotating and collects on the base 18. The air gaps 88 between the ring elements 82 of the base 18 are closed at this time, so that the particles cannot fall through the base 18.

The wall 16 is then set rotating and, via the feed duct 92, air is fed in under the base 18 in accordance with arrows 112, being introduced into the container 14 through the air gaps 88 between the ring elements 82. The air stream introduced in this way has the effect, according to the arrows 90, that the material 12 is initially moved along the base toward the wall 16. Because of the rotation of the oblique wall 16, the material 12 is then moved upward along the wall 16 on account of centrifugal forces and reaches the stationary deflection element 20. On the deflection element 20, more precisely on its sliding surface, on which the material 12 moves, the air fed in through the air gaps 34 and 36 then forms an air film or an air cushion, which takes the particulate material 12 with it along the deflection element 20 without the material 12 coming into abrasive contact with the sliding surface of the deflection element 20. From the annular end of the deflection element 20, facing the center of the container, the particulate material 12 then falls onto the return surface 30 and slides downward on the latter under the action of the force of gravity, assisted by an air stream introduced through the gaps 96 between the ring elements 94 of the return surface 30, into an internal-diameter region of the container 14. From the lower end of the return surface 30, the particulate material 12 falls back onto the base 18. As it falls back freely onto the base, it is sprayed with a moist covering medium by the annular gap nozzle 102.

Both the air introduced through the base 18 and the air introduced through the air gaps 34 and 36 is additionally used here for drying the moist covering medium on the particles of the material 12, likewise, the air stream passing through the return surface 30 also has a drying action on the particulate material sliding down on said surface. The air stream introduced in total into the container 14 is carried away as waste air via a discharge duct 114, to which a suction blower, not illustrated, is connected, according to arrows 116 (cf. also FIG. 2).

The air stream introduced through the air gaps 34 and 36 is preferably introduced through the air gaps 34 and 36 with a flow component which extends along a surface line of the wall 16 or of the adjacent deflection element 20, that is to say the material moves along the deflection element 20 substantially without any movement component in the circumferential direction but only with a movement component which has no movement components oriented at right angles to the plane of the drawing in FIGS. 1 and 2.

The air introduced through the air gaps 34 and 36 is partly discharged from the container 14 through the perforation 62 of the deflection element 20 according to the arrows 64 in FIG. 2 before the particulate material has reached the end of the deflection element 20, and is partly deflected onto the return surface 30, where it passes through the air gaps 96 in the latter, as described previously.

Further aspects of the apparatus 10 will be described in the following text.

The second section 56 of the deflection element can be moved upward from the position illustrated in FIG. 2 in accordance with an arrow 116 in FIG. 1, in order to empty the material 12 out of the container 14 out of the movement after the completion of a treatment process. Likewise, the first section 52 of the deflection element 20 can be moved upward. In order to move the second section 56 and/or the first section 52 of the deflection element 20 out, a linear drive 118, for example a pneumatic drive, is provided.

A further aspect of the apparatus 10 will be described in the following text with reference, inter alia, to FIG. 3.

The apparatus 10 has a frame 120 which has two semi cylindrical doors 122 and 124 which can be pivoted about a vertical pivot axis 126. In FIG. 3 the doors 122 and 124 are illustrated both in the open position (indicated by a dashed reference line) and in the closed position. Via the doors 122 and 124, when they are opened, access virtually on all sides to the container 14 and the remaining subassemblies of the apparatus 10 is provided.

The doors 122 and 124 are in each case fixed to a frame part 128, 130 via a plurality of spacers 132, 134. The supporting frames 128, 130 are tubular.

A cover 136, which can likewise be opened, forms the upper termination of the apparatus 10.

On the side opposite the pivot axis 126, which forms the operator side and forms the supply side of the apparatus 10, connections 138 are provided to supply the spraying device 32 and the air supply to the base 18.

The frame 120 of the apparatus 10 also has a plurality of vertically arranged frame parts which have a plurality of tubes arranged distributed circumferentially, for example four to six tubes, of which one is provided with the reference number 140 in FIG. 1. The tubular frame formed in this way stabilizes the doors 122 and 124 of the apparatus 10.

A support 142 for the doors 122 and 124 is also illustrated in FIG. 1.

The tubular frame parts of the apparatus 10 are simultaneously used to feed washing liquid to a plurality of nozzles 142, through which washing liquid is discharged in order to clean the interior of the apparatus following a treatment pass or before a batch change.

What is claimed is:

1. An apparatus for treating a particulate material, comprising:
a container having a base, an upright wall widening in an upward direction, and a deflection element adjoining said wall in an upper region of said container in order to deflect a direction of movement of said material;
said wall being rotatable about a vertical axis of rotation;
an opening for placing particulate material in to the container;
a first air gap in an upper portion of the wall that transitions from said wall to said deflection element; and
an air feed device for feeding an air stream through said first air gap into said container, at least one of said first air gap and said air feed device being configured such that said air stream introduced through said first air gap has a flow component oriented substantially in an upward direction and, in a region adjoining said air gap, oriented substantially tangentially with respect to at least one of said wall and said deflection element.

2. The apparatus of claim 1, wherein, in said upper portion of said wall that transitions from said wall to said deflection element, there is a second air gap which is spaced apart vertically from said first air gap, at least one of said second air gap and said air feed device being configured such that an air stream fed in by said air feed device has a flow component oriented substantially in an upward direction and, in a region adjoining said second air gap, oriented substantially tangentially with respect to at least one of said wall and said deflection element.

3. The apparatus of claim 1, wherein said deflection element has a first section which directly adjoins said wall, said first air gap being present between an upper end of said wall and a lower end of said first section.

4. The apparatus of claim 3, wherein said first section widens in an upward direction with a shape accommodating the shape of said wall in a region of said upper end of said wall.

5. The apparatus of claim 1, wherein said deflection element has a first section which directly adjoins said wall, said first air gap being present between an upper end of said wall and a lower end of said first section, and wherein said first section does not corotate with said wall.

6. The apparatus of claim 1, wherein, in said upper portion of said wall that transitions from said wall to said deflection element, there is a second air gap, which is spaced apart vertically from said first air gap, and wherein said deflection element has a first section which directly joins said wall, wherein said deflection element has at least a second section, and wherein said second air gap is arranged between an upper end of said first section and a lower end of said second section.

7. The apparatus of claim 6, wherein said second section, as viewed from a center of said container, is curved concavely, and wherein said lower end of said second section adjoins said upper end of said first section with a form fit.

8. The apparatus of claim 1, wherein, in said upper portion of said wall that transitions from said wall to said deflection element, there is a second air gap, which is spaced apart vertically from said first air gap, and wherein said deflection element has a first section which directly joins said wall, wherein said deflection element has at least a second section, and wherein said second air gap is arranged between an upper end of said first section and a lower end of said second section, and wherein said second section does not corotate with said wall.

9. The apparatus of claim 1, wherein said deflection element is air-permeable over a subregion which follows said first air gap.

10. The apparatus of claim 1, wherein a width of said first air gap is adjustable.

11. The apparatus of claim 1, wherein adjustable guide elements are arranged at said first air gap.

12. The apparatus of claim 1, wherein said base has an air gap, and wherein an air feed device is provided for said base, at least one of said air gap in said base and said air feed device for said base being configured in such a way that said air stream introduced through said air gap in said base has a flow component oriented substantially tangentially with respect to said base and toward said wall.

13. The apparatus of claim 12, wherein said base is constructed from a plurality of concentric ring elements with different diameters, which are arranged in layers partly overlapping one another radially and between which a plurality of air gaps form.

14. The apparatus of claim 1, wherein said base has an air gap, and wherein a width of said air gap in said base can be adjusted.

15. The apparatus of claim 1, wherein said base has an air gap, and wherein said air gap in said base opens automatically when being acted on with an air stream and closes when said air stream is switched off.

16. The apparatus of claim 1, wherein said base has an air gap and wherein said base has air guide elements which additionally impart to an air stream introduced through air gap in said base a flow component oriented in a direction of rotation of said wall.

17. The apparatus of claim 1, wherein said base does not corotate with said wall.

18. The apparatus of claim 1, wherein said container has a return surface that tapers in a downward direction, on which said material deflected by said deflection element is moved back downward to said base.

19. The apparatus of claim 18, wherein said return surface is supported on said wall via a sliding ring bearing in such a way that said return surface does not corotate with said wall or rotates with a rotational speed lower than a rotational speed of said wall.

20. The apparatus of claim 1, wherein said container has a return surface which is constructed from a plurality of concentric ring elements, which partly overlap one another and between which a plurality of air gaps form.

21. The apparatus of claim 20, wherein said air gaps in said return surface are configured in such a way that an air stream introduced through said air gaps has a flow component oriented in a downward direction and substantially parallel to said return surface.

22. The apparatus of claim 1, wherein a spraying device for spraying said material with a moist covering medium is arranged in said container and has an annular gap nozzle, said nozzle being arranged upright in said container, and said covering medium and spraying air being fed into said nozzle in an upward direction, and wherein said nozzle is acted on from above with an additional air stream.

23. An apparatus for treating a particulate material, comprising:
a container having a base, an upright wall widening in an upward direction, and a deflection element adjoining said wall in an upper region of said container in order to deflect a direction of movement of said material;
said wall being rotatable about a vertical axis of rotation;
an opening for placing particulate material in to the container;
a first air gap in an upper portion of the wall that transitions from said wall to said deflection element;
an air feed device for feeding an air stream through said first air gap into said container, at least one of said first air gap and said air feed device being configured such that said air stream introduced through said first air gap has a flow component oriented substantially in an upward direction and, in a region adjoining said air gap, oriented substantially tangentially with respect to at least one of said wall and said deflection element; and
a second air gap which is spaced apart vertically from said first air gap, wherein said air feed device has a first feed duct for feeding a first air stream to said first air gap, and at least a second feed duct, separated from said first feed duct, for feeding a second air stream to said second air gap.

24. The apparatus of claim 23, wherein at least one of said second air gap and said air feed device being configured such that an air stream fed in by said air feed device has a flow component oriented substantially in an upward direction and, in a region adjoining said second air gap, oriented substantially tangentially with respect to at least one of said wall and said deflection element.

25. The apparatus of claim 23, wherein said deflection element has a first section that adjoins said wall and a second section that adjoins said first section, wherein said first air gap is between an upper end of said wall and a lower end of said first section, and wherein said second air gap is arranged between an upper end of said first section and a lower end of said second section.

26. The apparatus of claim 25, wherein said first section or said second section do not corotate with said wall.

27. The apparatus of claim 25, wherein said first section widens in an upward direction with a shape accommodating the shape of said wall in a region of said upper end of said wall, and wherein said second section, as viewed from a center of said container, is curved concavely.

28. An apparatus for treating a particulate material, comprising:
a container having a base, an upright wall widening in an upward direction, and a deflection element adjoining said wall in an upper region of said container in order to deflect a direction of movement of said material;
said wall being rotatable about a vertical axis of rotation;
an opening for placing particulate material in to the container;
a first air gap in an upper portion of the wall that transitions from said wall to said deflection element, said first air gap forming either an interrupted or uninterrupted annular gap that encompasses the vertical axis of rotation; and
an air feed device for feeding an air stream through said first air gap into said container, at least one of said first air gap and said air feed device being configured such that said air stream introduced through said first air gap has a flow component oriented substantially in an upward direction and, in a region adjoining said air gap, oriented substantially tangentially with respect to at least one of said wall and said deflection element.

* * * * *